United States Patent
DiGiovanni (10) Patent No.: US 9,259,803 B2
(45) Date of Patent: Feb. 16, 2016

(54) METHODS AND APPARATUSES FOR FORMING CUTTING ELEMENTS HAVING A CHAMFERED EDGE FOR EARTH-BORING TOOLS

(75) Inventor: Anthony A. DiGiovanni, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1279 days.

(21) Appl. No.: 12/265,462

(22) Filed: Nov. 5, 2008

(65) Prior Publication Data

US 2009/0114628 A1     May 7, 2009

Related U.S. Application Data (60) Provisional application No. 60/985,339, filed on Nov. 5, 2007.

(51) Int. Cl.
  *B23K 26/00*  (2014.01)
  *B23K 26/10*  (2006.01)
  *B23K 26/36*  (2014.01)
  *B23K 26/14*  (2014.01)
  (Continued)

(52) U.S. Cl.
  CPC ......... *B23K 26/1417* (2013.01); *B23K 26/0075* (2013.01); *B23K 26/0823* (2013.01); *B23K 26/10* (2013.01); *B23K 26/103* (2013.01); *B23K 26/36* (2013.01); *E21B 10/567* (2013.01); *B23K 2201/002* (2013.01)

(58) Field of Classification Search
  CPC .. B23K 20/125; B23K 26/10; B23K 26/1417; B23K 2201/002; B23K 26/0823; B23K 26/38; B23K 26/103; B23K 26/00; B23K 26/0066; B23K 26/0075; B23K 26/0039; B23K 26/36; E21B 10/567

USPC ............ 219/121.72, 121.18, 121.12, 121.84, 219/121.19, 121.2, 121.71, 121.6, 219/121.67–121.69, 121.85, 121.76; 216/94; 175/425–435

See application file for complete search history.

(56) References Cited

U.S. PATENT DOCUMENTS 3,482,075 A * 12/1969 Wilde ...................... 219/121.68
3,597,578 A    8/1971 Sullivan et al.
(Continued)

FOREIGN PATENT DOCUMENTS

EP        0352895 A2    1/1990
EP        0541071 A1    5/1993
(Continued)

OTHER PUBLICATIONS

Ascarelli, P., et al., "Structural Modifications of Diamond Films Induced by Pulsed Laser Treatment," SPIE, vol. 3404, pp. 178-186, 1998.
(Continued)

*Primary Examiner* — Samuel M Heinrich
(74) *Attorney, Agent, or Firm* — TraskBritt (57) ABSTRACT

Apparatuses for forming chamfers on superabrasive tables of cutting elements for earth-boring tools include a chuck for temporarily holding and positioning a cutting element, and at least one emitter for emitting a beam of energy toward an edge of a superabrasive table of a cutting element held and positioned by the chuck. Methods of forming cutting elements for earth-boring tools and methods for forming earth-boring tools are also disclosed.

29 Claims, 4 Drawing Sheets

(51) Int. Cl.
  *B23K 26/08* (2014.01)
  *E21B 10/567* (2006.01)

(56) References Cited

U.S. PATENT DOCUMENTS

| | | | |
|---|---|---|---|
| 3,604,890 A * | 9/1971 | Mullaney et al. | 219/121.67 |
| 3,749,878 A | 7/1973 | Sullivan et al. | |
| 4,010,345 A | 3/1977 | Banas et al. | |
| 4,498,917 A * | 2/1985 | Weinstein et al. | 65/382 |
| 4,533,815 A * | 8/1985 | Ecer | 219/121.66 |
| RE32,036 E | 11/1985 | Dennis | |
| 4,662,708 A * | 5/1987 | Bagdal | 359/210.1 |
| 4,694,139 A * | 9/1987 | Roder | 219/121.78 |
| 4,781,770 A * | 11/1988 | Kar | 148/220 |
| 4,827,947 A * | 5/1989 | Hinz | 131/281 |
| 4,847,112 A * | 7/1989 | Halleux | 427/556 |
| 4,987,800 A | 1/1991 | Gasan et al. | |
| 5,067,250 A | 11/1991 | Auweiler et al. | |
| 5,149,936 A * | 9/1992 | Walton, II | 219/121.65 |
| 5,149,937 A * | 9/1992 | Babel et al. | 219/121.68 |
| 5,154,023 A | 10/1992 | Sioshansi | |
| 5,247,923 A | 9/1993 | Lebourg | |
| 5,286,006 A * | 2/1994 | Ogura | 266/77 |
| 5,366,522 A | 11/1994 | Nakamura et al. | |
| 5,447,208 A | 9/1995 | Lund et al. | |
| 5,483,038 A | 1/1996 | Ota et al. | |
| 5,504,303 A | 4/1996 | Nagy | |
| 5,554,415 A | 9/1996 | Turchan et al. | |
| 5,569,399 A | 10/1996 | Penney et al. | |
| 5,582,749 A * | 12/1996 | Mori et al. | 219/121.84 |
| 5,601,477 A | 2/1997 | Bunting et al. | |
| 5,734,146 A | 3/1998 | La Rocca | |
| 5,742,026 A | 4/1998 | Dickinson, Jr. et al. | |
| 5,776,220 A * | 7/1998 | Allaire et al. | 65/112 |
| 5,826,772 A * | 10/1998 | Ariglio et al. | 225/2 |
| 5,853,268 A | 12/1998 | Simpson | |
| 5,886,320 A | 3/1999 | Gallo et al. | |
| 5,944,129 A | 8/1999 | Jensen | |
| 5,962,071 A * | 10/1999 | Reineck et al. | 427/535 |
| 5,965,043 A * | 10/1999 | Noddin et al. | 219/121.71 |
| 5,967,250 A | 10/1999 | Lund et al. | |
| 6,000,483 A | 12/1999 | Jurewicz et al. | |
| 6,023,040 A | 2/2000 | Zahavi et al. | |
| 6,119,335 A * | 9/2000 | Park et al. | 29/830 |
| 6,204,475 B1 | 3/2001 | Nakata et al. | |
| 6,326,588 B1 * | 12/2001 | Neubauer et al. | 219/121.72 |
| 6,353,204 B1 * | 3/2002 | Spaay et al. | 219/121.72 |
| 6,423,928 B1 | 7/2002 | Piwczyk | |
| 6,469,729 B1 * | 10/2002 | Ryan | 347/248 |
| 6,489,589 B1 * | 12/2002 | Alexander | 219/121.69 |
| 6,521,862 B1 * | 2/2003 | Brannon | 219/121.66 |
| 6,559,413 B1 * | 5/2003 | Muenchausen et al. | 219/121.72 |
| 6,562,698 B2 * | 5/2003 | Manor | 438/460 |
| 6,590,181 B2 * | 7/2003 | Choo et al. | 219/121.68 |
| 6,596,225 B1 | 7/2003 | Pope et al. | |
| 6,605,798 B1 | 8/2003 | Cullen | |
| 6,655,845 B1 | 12/2003 | Pope et al. | |
| 6,766,870 B2 | 7/2004 | Overstreet | |
| 6,779,951 B1 | 8/2004 | Vale et al. | |
| 6,844,521 B2 | 1/2005 | Staufer et al. | |
| 6,845,635 B2 | 1/2005 | Watanabe et al. | |
| 6,969,822 B2 | 11/2005 | Pollard | |
| 7,022,941 B2 | 4/2006 | Joseph et al. | |
| 7,065,121 B2 | 6/2006 | Filgas et al. | |
| 7,163,875 B2 | 1/2007 | Richerzhagen | |
| 7,188,692 B2 | 3/2007 | Lund et al. | |
| 7,294,807 B2 * | 11/2007 | Callies et al. | 219/121.71 |
| 7,323,699 B2 | 1/2008 | Hopkins et al. | |
| 8,010,224 B2 * | 8/2011 | Yamaguchi et al. | 700/173 |
| 8,651,204 B2 * | 2/2014 | Webb | 175/434 |
| 8,991,525 B2 * | 3/2015 | Bilen et al. | 175/428 |
| 2002/0104831 A1 * | 8/2002 | Chang et al. | 219/121.7 |
| 2002/0148819 A1 * | 10/2002 | Maruyama et al. | 219/121.78 |
| 2003/0000928 A1 * | 1/2003 | Forlong | 219/121.39 |
| 2004/0163854 A1 | 8/2004 | Lund et al. | |
| 2004/0198028 A1 * | 10/2004 | Tanaka et al. | 438/487 |
| 2004/0206734 A1 * | 10/2004 | Horsting | 219/121.74 |
| 2005/0241446 A1 * | 11/2005 | Joseph | 83/13 |
| 2006/0043622 A1 * | 3/2006 | Kumazawa et al. | 264/1.1 |
| 2006/0060387 A1 * | 3/2006 | Overstreet et al. | 175/339 |
| 2006/0070982 A1 | 4/2006 | Patel | |
| 2006/0138097 A1 * | 6/2006 | Hiramatsu | 219/121.7 |
| 2006/0180354 A1 * | 8/2006 | Belnap et al. | 175/374 |
| 2006/0247769 A1 | 11/2006 | Molz et al. | |
| 2006/0272571 A1 * | 12/2006 | Cho | 117/84 |

FOREIGN PATENT DOCUMENTS

| | | |
|---|---|---|
| EP | 1844891 | 10/2007 |
| WO | 0037208 A1 | 6/2000 |
| WO | 2006038017 A2 | 4/2006 |

OTHER PUBLICATIONS

Chao, C.L., et al., "Investigation of Laser Ablation of CVD Diamond Film," Proc. of SPIE, vol. 5713, pp. 21-28, 2005.

Eder, Kurt, "Dies—New thoughts on machinery for synthetic PCD die piercing and profiling," Wire Journal International, pp. 34-40, Dec. 1984.

Gloor, S., et al., "Laser ablation of diamond films in various atmospheres," Diamond and Related Materials, vol. 7, pp. 607-611, 1998.

Harrison, Paul, et al., "Enhanced Cutting of Polycrystalline Diamond with a Q-Switched Diode Pumped Solid State Laser," Powerlase Ltd., Paper #202, 8 pages, http://www.rpmclasers.com/Powerlase/Technical%20Papers/Enhanced%20Cutting%20of%20Poycrystalline%20Diamond%20with%20a%20Q-switched%20Diode%20Pumped%20Soild%20State%20Laser.pdf., no date.

Harrison, Paul M. et al., "Laser Processing of Polycrystalline Diamond, Tungsten Carbide and a Related Composite Material," Journal of Laser Applications, vol. 18, issue 2, pp. 117-126, May 2006.

Khomich, A.V., et al., "Optical properties of laser-modified diamond surface," SPIE, vol. 3484, pp. 166-174, 1998.

Kim, Yong-Gi, et al., "Microroughness Reduction of Tungsten Films by Laser Polishing Technology with a Line Beam," Japanese Journal of Applied Physics, vol. 43, No. 4A, pp. 1315-1322, 2004.

Kiwus, Ulrich, "Grinding and polishing of diamond wire dies with ultra-hard, ready-made needles and direct ultrasound generators," Wire, vol. 42, pp. 98-99, Feb. 1992.

Kononenko, V.V.., et al., "Control of laser machining of polycrystalline diamond plates by the method of low-coherence optical interferometry," Quantum Electronics, vol. 35, No. 7, pp. 622-626, Jul. 2005.

Konov, V.I., et al., "Laser microprocessing of diamond and diamond-like films," SPIE vol. 2045, pp. 184-192, 1994.

Laguarta, F., et al., "Laser application for optical glass polishing," SPIE, vol. 2775, pp. 603-610, 1996.

Levy, Aron, "Drilling, Sawing, and Contouring Industrial and Gem Diamonds by Laser," pp. 223-236, no publication info. or date.

Meijer, J., et al., "Laser Machining by short and ultrashort pulses, state of the art and new opportunities in the age of the photons," 20 pages, CIRP Annals-Manufacturing Technology, 2002.

Murahara, Masataka, "Excimer Laser-Induced Photochemical Polishing of SiC Mirror," Proc. SPIE, vol. 4679, pp. 69-74, 2002.

Nowak, K.M., et al., "A model for "cold" laser ablation of green state ceramic materials," Appl. Phys. A, vol. 91, pp. 341-348, 2008.

Pimenov, S.M. et al., "Laser Polishing of Diamond Plates," Appl. Phys. A, vol. 69, pp. 81-88, 1999.

Quintero, F., et al., "Optimization of an off-axis nozzle for assist gas injection in laser fusion cutting," Optics and Lasers in Engineering, vol. 44, pp. 1158-1171, 2006.

Smith, Maurice, "Drilling & Completions, Cutting Edge, PDC Bits Increasingly Displace Roller Cone Bits as Technology Rapidly Evolves," New Technology Magazine, 8 pages, Jan./Feb. 2005.

SPE, "New Bit Design and Cutter Technology Extend PDC Applications to Hard-Rock Drilling," JPT, pp. 63-64, Dec. 2005.

SPE, "Faster and Longer Bit Runs With New-Generation PDC Cutter," JPT, pp. 73-75, Dec. 2006.

(56) References Cited

OTHER PUBLICATIONS

Watson, G.R., et al., "Using New Computational Fluid Dynamics Techniques to Improve PDC Bit Performance," SPE/IADC 37580, pp. 91-105, 1997.

Windholz, R., et al., "Nanosecond pulsed excimer laser machining of chemical vapour deposited diamond and highly oriented pyrolytic graphite, Part I, An experimental investigation," Journal of Materials Science, vol. 32, pp. 4295-4301, 1997.

Xu, Feng, et al., "Study on Energy Density Needed in ND:YAG Laser Polishing of CVD Diamond Thick-Film," 7th International Conference on Progress of Machining Technology, pp. 382-387, Dec. 8-11, 2004.

Zhang, G.F., et al., "An Experimental Study on Laser Cutting Mechanisms of Polycrystalline Diamond Compacts," Annals of the CIRP, vol. 56, No. 1, pp. 201-204, 2007.

Meijer, Johan, "Laser beam machining (LBM), state of the art and new opportunities," Journal of Materials Processing Technology, vol. 149, pp. 2-17, 2004.

International Search Report for International Application No. PCT/US2008/082405 mailed May 12, 2010, 5 pages.

International Written Opinion for International Application No. PCT/US2008/082405 mailed May 12, 2010, 7 pages.

EP Office Action for EP Application No. 08 847 397 .0 dated Feb. 22, 2011.

\* cited by examiner

METHODS AND APPARATUSES FOR FORMING CUTTING ELEMENTS HAVING A CHAMFERED EDGE FOR EARTH-BORING TOOLS

CROSS CROSS-REFERENCE TO RELATED APPLICATION

This application claims the benefit of U.S. provisional patent application, Ser. No. 60/985,339, filed Nov. 5, 2007, which is incorporated herein in its entirety.

TECHNICAL FIELD

Embodiments of the present invention relate generally to forming bore holes in subterranean earth formations and, more particularly, to apparatuses and methods for forming cutting elements for earth-boring tools used in drilling such bore holes.

BACKGROUND

Various earth-boring tools such as rotary drill bits (including roller cone bits and fixed-cutter or drag bits), core bits, eccentric bits, bicenter bits, reamers, and mills are commonly used in forming bore holes or wells in earth formations. Such tools often may include one or more cutting elements on a formation-engaging surface thereof for removing formation material as the earth-boring tool is rotated or otherwise moved within the bore hole.

Figure 1:
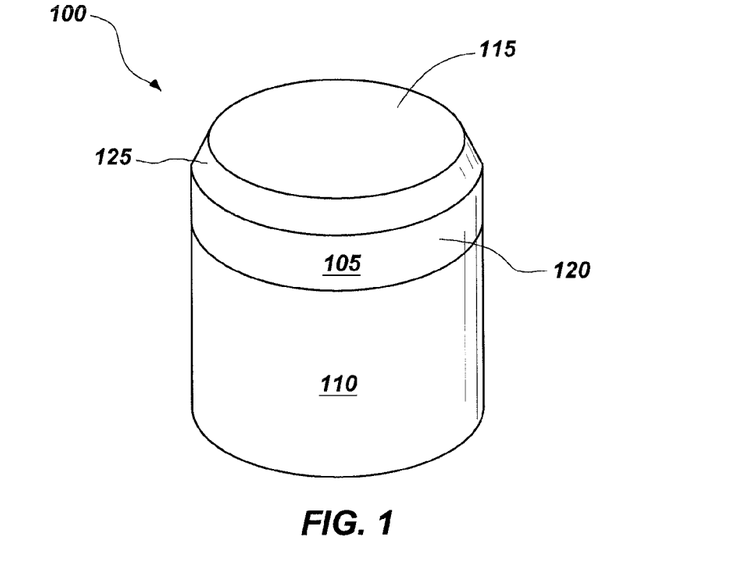
FIG. 1 illustrates a conventional cutting element.

For example, fixed-cutter bits (often referred to as "drag" bits) have a plurality of cutting elements affixed or otherwise secured to a face (i.e., a formation-engaging surface) of a bit body. Such cutting elements generally have either a disk shape, or in some instances, a more elongated, substantially cylindrical shape. FIG. 1 illustrates an example of a conventional cutting element 100. The cutting element 100 includes a layer of superabrasive material 105 (which is often referred to as a "table"), such as mutually bound particles of polycrystalline diamond, formed on and bonded to a supporting substrate 110 of a hard material such as cemented tungsten carbide. The table of superabrasive material 105 includes a front cutting face 115, a rear face (not shown) abutting the supporting substrate 110, and a peripheral surface 120. During a drilling operation, a portion of a cutting edge, which is at least partially defined by the peripheral portion of the cutting face 115, is pressed into the formation. As the earth-boring tool moves relative to the formation, the cutting element 100 is drug across the surface of the formation and the cutting edge of the cutting face 115 shears away formation material. Such cutting elements 100 are often referred to as "polycrystalline diamond compact" (PDC) cutting elements, or cutters.

During drilling, cutting elements 100 are subjected to high temperatures, high loads, and high impact forces. These conditions can result in damage to the layer of superabrasive material 105 (e.g., chipping, spalling). Such damage often occurs at or near the cutting edge of the cutting face 115 and is caused, at least in part, by the high impact forces that occur during drilling. Damage to the cutting element 100 results in decreased cutting efficiency of the cutting element 100. In severe cases, the entire layer of superabrasive material 105 may separate (i.e., delaminate) from the supporting substrate 110. Furthermore, damage to the cutting element 100 can eventually result in separation of the cutting element 100 from the surface of the earth-boring tool to which it is secured.

As shown in FIG. 1, it has been found that the incidence of damage to the cutting element 100 may be reduced by beveling the cutting edge of the cutting face 115 to provide an angled, arcuate surface or "chamfer" 125 along at least a portion of the periphery of the layer of superabrasive material 105. In other words, a chamfered edge 125 may be formed for durability and long-term cutting efficiency. Conventionally, the chamfered edge 125 is formed by mechanical processes, such as lapping and grinding processes. Such conventional mechanical processes are historically prone to generating residual and subsurface microscopic damage. The damage is a result of the mechanical means by which a surface is abrasively manufactured and can only be minimized, not eliminated, through successively finer polishing steps. Such residual microfractures can remain at, and even beneath, the polished surface. These residual defects can propagate under the severe cutting stresses and loads into longer or larger defects, leading ultimately to the aforementioned spalling and delamination of the superabrasive material layer 105.

Additionally, in order to provide an improved finish (i.e., a more polished surface), an increasing number of polishing steps are required, which proportionally increases the amount of time required, and the attainable increments of finish improvement using conventional techniques are limited. Further, the high number of required steps for achieving a fine, polished finish cannot be reduced by applying a fine polish directly to a very rough surface. Indeed, attempting to achieve a fine polished surface directly from a very rough surface of a hard material will actually take longer than first achieving an intermediate finish prior to a fine finish.

BRIEF SUMMARY

Various embodiments of the present invention comprise apparatuses for forming chamfers on a cutting element for an earth-boring tool. In one or more embodiments, the apparatus may comprise a device configured to temporarily hold and position a cutting element for an earth-boring tool. At least one emitter is configured and oriented to emit a beam of energy toward an edge of a superabrasive table of a cutting element held and positioned by the device.

Other embodiments comprise methods of forming a cutting element. One or more embodiments of such methods may comprise forming a layer of superabrasive material on a substrate. A chamfer may be formed at least partially along a peripheral edge of the layer of superabrasive material using an energy beam.

Still other embodiments of the present invention comprise methods for forming an earth-boring tool. One or more embodiments of such methods may comprise temporarily securing a cutting element for an earth-boring tool in a chuck. At least one energy beam may be directed onto an edge of a superabrasive table of the cutting element. A point of contact between the at least one energy beam and the superabrasive table may be moved along the edge of the superabrasive table of the cutting element to form a chamfer along at least a portion of the edge. The cutting element may be secured to a body of an earth-boring tool.

DETAILED DESCRIPTION

The illustrations presented herein are, in at least some instances, are not actual views of any particular cutting element insert, cutting element, drill bit, system or method, but are merely idealized representations which are employed to describe the present invention. Additionally, elements common between figures may retain the same numerical designation.

As used herein, the term "chamfer" refers to any surface formed along at least a portion of a peripheral edge of a cutting element, such as the peripheral edge of the cutting face on a diamond or other superabrasive table of a PDC cutting element. By way of example and not limitation, the term "chamfer," as used herein, may refer to a single-surface chamfer, a dual-surface chamfer, a triple-surface chamfer, a rounded edge, or any other protective structural configuration for a cutting edge.

Figure 2:
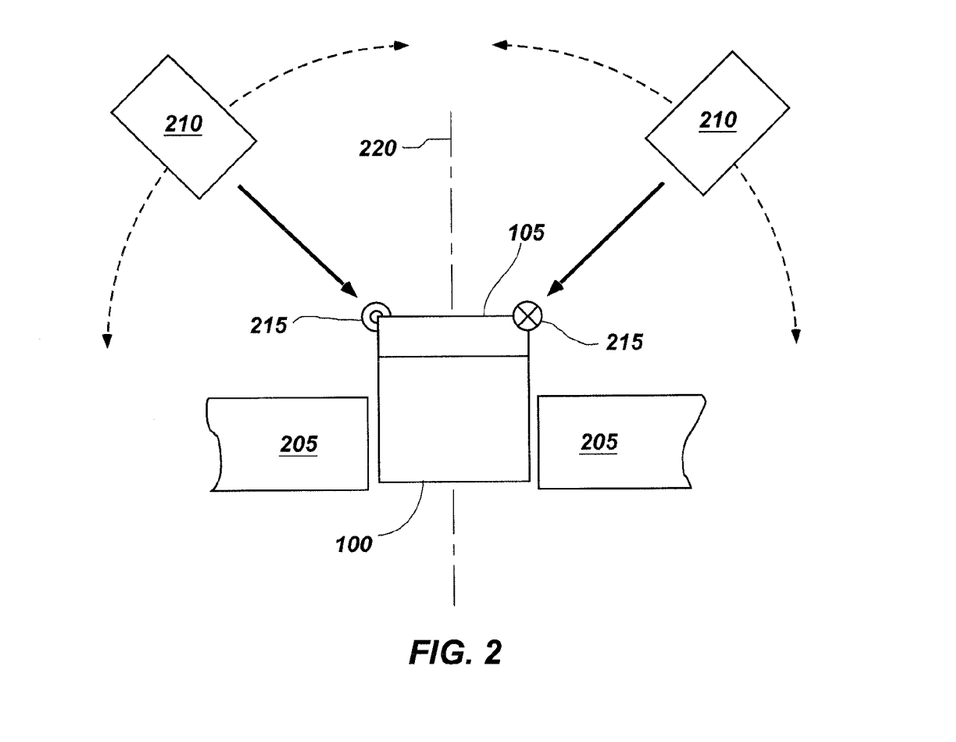
FIG. 2 is a schematic figure illustrating a configuration that may be employed in embodiments of apparatuses and methods of the present invention that may be used for forming a chamfer on a cutting element for an earth-boring tool.

In some embodiments, the present invention provides apparatuses and methods for forming and/or polishing a chamfer on a cutting element. FIG. 2 is a schematic figure illustrating a configuration that may be employed in such embodiments of apparatuses and methods. As shown in FIG. 2, such apparatuses and methods may be used to form and/or polish a chamfer along a peripheral edge of a layer, or "table" of superabrasive material 105 on a cutting element 100. A chuck 205 may be used to hold and position the cutting element 100, and at least one emitter 210 may be positioned and oriented to emit a focused beam of energy toward the peripheral edge of the layer of superabrasive material 105. As used herein, the term "chuck" means any tool or device configured to temporarily hold and position a cutting element 100. As shown in FIG. 2, in some embodiments, two emitters 210 may be employed, although one emitter 210 or more than two emitters 210 may be employed in other embodiments of the present invention.

As further shown in FIG. 2, one or more optional gas jets 215 may be positioned and oriented to direct a stream of gas toward the peripheral edge of the layer of superabrasive material 105. For example, the gas jets 215 may be positioned and oriented to direct a stream of gas toward a contact area 310 (FIGS. 3A and 3B) on the layer of superabrasive material 105 at which an energy beam emitted by an emitter 210 contacts the layer of superabrasive material 105.

The chuck 205 may be configured to rotate the cutting element 100 about an axis 220, which may comprise a symmetrical axis of the cutting element 100 (a longitudinal axis about which the cutting element 100 is symmetric). The chuck 205 may be configured to rotate the cutting element 100 in either a clockwise or counter-clockwise direction. In additional embodiments, the chuck 205 may hold the cutting element 100 in a fixed position while the one or more emitters 210 used to form and/or polish the chamfer rotate around the cutting element 100. In yet other embodiments, the chuck 205 may remain in a fixed position and the one or more emitters 210 may remain fixed with relation to its position to the cutting element 100 while the beam of energy may be manipulated in some way such as, but not limited to, employing mobile mirrors, beam splitters, and/or rotating, tilting, or otherwise adjusting the direction of the beam of energy. In still other embodiments, both the cutting element 100 and the one or more emitters 210 may be rotated relative to one another. By way of example and not limitation, the chuck 205 may comprise a rotatable chuck or similar device. Other embodiments comprising additional configurations are also possible for directing the beam of energy around the peripheral edge of the layer of superabrasive material 105.

The at least one emitter 210 may comprise a device configured to emit a beam of energy that may be used to form and/or polish a chamfer on the cutting element 100 without subjecting the cutting element 100 to the forces and other conditions typically encountered when forming a chamfer using conventional mechanical grinding and polishing techniques. In some embodiments, the at least one emitter 210 may be positioned above the cutting element 100 and oriented to direct a beam of energy toward the peripheral edge of the layer of superabrasive material 105 in a direction generally parallel to the longitudinal axis 220. In other embodiments, the at least one emitter 210 may be positioned above the cutting element 100 and oriented to direct a beam of energy toward the peripheral edge of the layer of superabrasive material 105 in a direction generally perpendicular to the longitudinal axis 220. In yet additional embodiments, the at least one emitter 210 may be positioned generally above and to the side of the cutting element 100 and oriented to direct a beam of energy toward the peripheral edge of the layer of superabrasive material 105 in a direction oriented at an acute angle to the longitudinal axis 220 (e.g., an angle between about 15 degrees and about 75 degrees, such as, for example, about 30 degrees, about 45 degrees, or about 60 degrees to the longitudinal axis 220), as shown in FIG. 2.

In some embodiments, the at least one emitter 210 may comprise a laser device configured to emit a beam of electromagnetic radiation. In other embodiments, the at least one emitter 210 may comprise a device configured to emit a beam of particles, such as an ion beam or a molecular beam.

In embodiments employing one or more lasers as the at least one emitter 210, the one or more lasers may be positioned and controlled in a manner analogous to standardized computer numerical control (CNC) machining processes employed in various other applications. The one or more lasers may be configured to emit a beam of electromagnetic radiation at any wavelength that will be at least partially absorbed by the material of the layer of superabrasive material 105. When two or more lasers are employed, the two or more lasers may be configured to emit electromagnetic radiation at the same wavelength as well as different wavelengths. By way of example and not limitation, a first laser (e.g., a Nd-YAG laser) may be employed that is configured to emit radiation having a wavelength of 532 nm. A second laser (e.g., an ArF excimer laser) may be employed that is configured to emit radiation having a wavelength of 193 nm. In this non-limiting example, the first laser may be used to roughly form the chamfer, and the second laser may be used to refine and smooth the finish of the chamfer roughly formed by the first laser. Although non-limiting examples are given of suitable lasers and wavelengths, it should be noted that a variety of suitable lasers, as well as suitable wavelengths are available and may be employed according to the particular application.

In other embodiments, the at least one laser may be configured to emit electromagnetic radiation at a wavelength that is not entirely absorbed by the layer of superabrasive material 105. In such embodiments, a thin layer of material (not shown) selected to absorb the radiation emitted by the at least one laser may be disposed over the layer of superabrasive material 105 in such a manner that energy absorbed by the thin layer of material may be transferred into the layer of superabrasive material 105.

In some embodiments, one or more gas jets 215 may be provided to enhance the formation and/or polishing of the chamfer by the at least one emitter 210. For example, at least one gas jet 215 may be configured to direct a stream of gas at the point where the beam emitted by an emitter 210 is impinging on the cutting element 100, also referred to herein as the contact area 310 and illustrated in FIGS. 3A and 3B. The stream of gas may comprise a steady stream, or alternatively, a pulsed stream. Furthermore, the composition of the gas may be selected or adjusted to increase the efficiency by which the emitter 210 is capable of removing (e.g., ablating) material from the layer of superabrasive material 105. In embodiments in which the layer of superabrasive material 105 comprises a layer of diamond material (e.g., polycrystalline diamond material), the gas jet 215 may be configured to provide a steady stream of pure oxygen ($O_2$) gas, or a gaseous mixture comprising oxygen ($O_2$) gas. The use of oxygen ($O_2$) gas may facilitate the conversion of diamond and/or graphite byproducts to carbon dioxide ($CO_2$) by supplying an amount of oxygen ($O_2$) in excess of that required for the corresponding reactions. The stream of gas may also entrain gaseous or other ablative byproducts therein and carry these byproducts away from the contact area 310 to further enhance the efficiency at which material is removed from the layer of superabrasive material 105.

In some embodiments, if the cutting element 100 comprises a PDC cutting element 100 in which the layer of superabrasive material 105 comprises a layer of polycrystalline diamond material with a cobalt binder, at least a portion of the layer of polycrystalline diamond material may be leached by conventional techniques to at least partially remove the cobalt binder from the layer of polycrystalline diamond material before the chamfer is formed using the at least one emitter 210. By removing at least a portion of the cobalt binder from the layer of polycrystalline diamond material in the regions at which the chamfer is to be formed using the one or more emitters 210, the efficiency by which the polycrystalline diamond material is removed during formation of the chamfer may be increased.

Figure 3A:
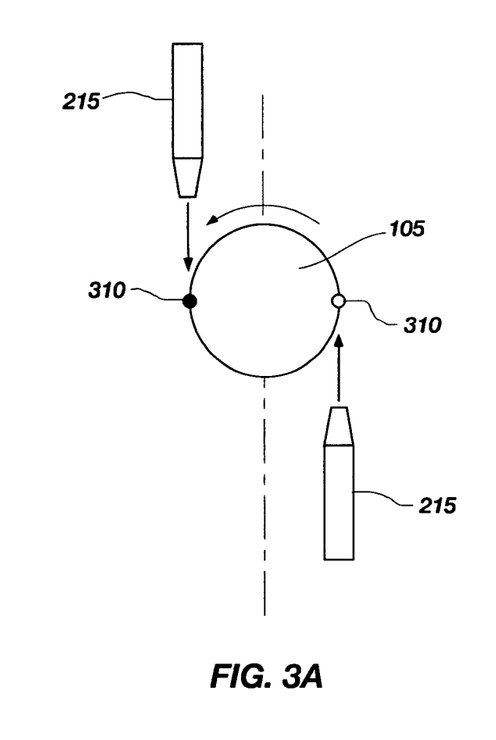
FIGS. 3A and 3B are schematic figures illustrating non-limiting examples of gas jet configurations that may be used in apparatuses and methods according to the configuration shown in FIG. 2.
Figure 3B:
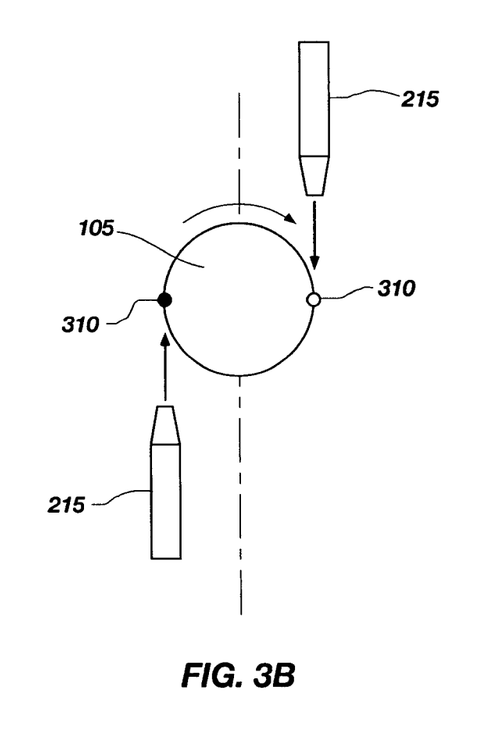

The gas jet 215 may be positioned and oriented so as to direct a gas stream toward the area on the cutting element 100 at which the chamfer is to be formed (e.g., the peripheral edge of the layer of superabrasive material 105). Referring to FIGS. 2, 3A, and 3B, the gas jet 215 may be positioned and oriented so that the stream of gas emitted thereby is generally tangential to the lateral surface of the cutting element 100 and contacts the peripheral edge of the layer of superabrasive material 105 at which the chamfer is to be formed. Furthermore, the gas jet 215 may be positioned and oriented so that the predominant velocity vector of the stream of gas emitted thereby is generally parallel to the velocity vector (due to rotation of the cutting element 100) of the chamfer edge at the point of laser contact on the cutting element 100 over which the stream of gas impinges on the cutting element 100. Such a configuration may reduce or minimize turbulent flow of the gas emitted by the gas jet 215 over the contact area 310. Any heating of the gas emitted by the gas jet 215 by the energy emitted by the at least one emitter 210 may ultimately result in reduced power being transmitted to the cutting element 100. Furthermore, turbulent flow of the gas emitted by the gas jet 215 may result in distortion of the energy beam emitted by the at least one emitter 210 thus reducing the efficiency of the process. By reducing or minimizing turbulence in the flow of gas emitted by the gas jet 215 over the contact area 310, distortion of the energy beam emitted by the at least one emitter 210 may be reduced, minimizing the loss of power ultimately transferred to the cutting element 100. Furthermore, the cross-sectional area and shape of the stream of gas emitted by the gas jet 215, as well as the velocity of the stream of gas emitted by the gas jet 215, may be tailored to maximize the efficiency of material removal from the cutting element 100.

In the non-limiting examples illustrated in FIGS. 3A and 3B, two gas jets 215 are employed, one for each of two emitters 210. In other words, a plurality of gas jets 215 may be used to direct a stream of gas toward each contact area 310 on the cutting element 100 at which an energy beam emitted by an emitter 210 impinges on the cutting element 100.

In embodiments employing a particle beam etching process (e.g., an ion beam etching process or a molecular beam etching process), the gas jet 215 may be omitted as unnecessary, as the use of such may hinder the particle beam etching process.

Figure 4:
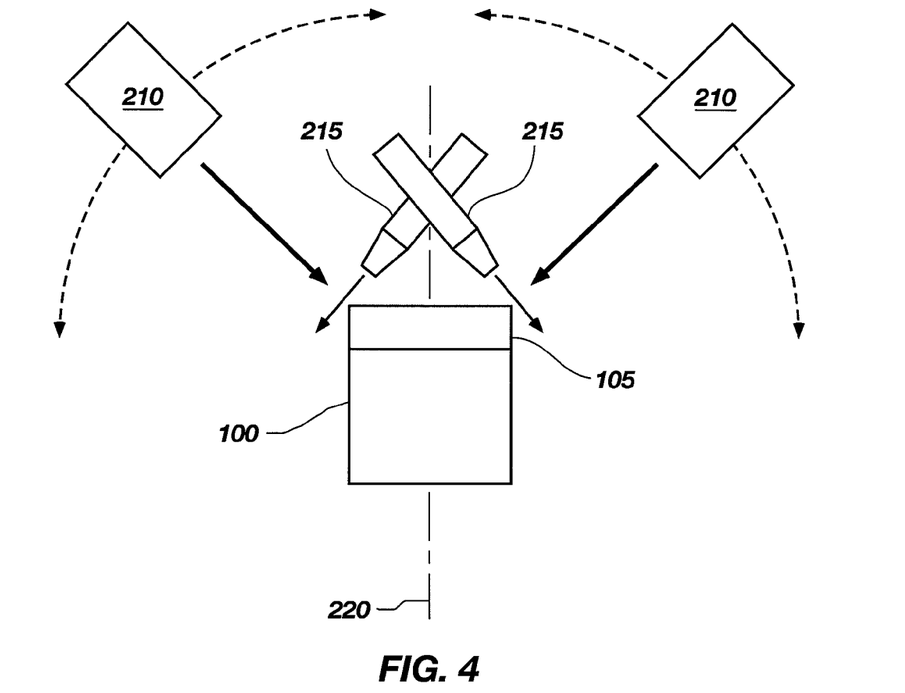
FIG. 4 is a schematic figure illustrating another configuration that may be employed in embodiments of apparatuses and methods of the present invention that may be used for forming a chamfer on a cutting element for an earth-boring tool.

FIG. 4 is a schematic figure illustrating another configuration that may be employed in embodiments of apparatuses and methods of the present invention that may be used for forming a chamfer on a cutting element for an earth-boring tool. The configuration shown in FIG. 4 is generally similar to that shown in FIG. 2 and includes two emitters 210 each configured to direct an energy beam toward an edge of a cutting element 100 on which it is desired to form a chamfer. In contrast to the configuration shown in FIG. 2, however, the configuration of FIG. 4 includes gas jets 215 positioned and oriented at an acute angle relative to the longitudinal axis 220. The gas jets 215 may be positioned and oriented such that the gas streams emitted thereby flow across the edge of the cutting element 100.

Figure 5A:
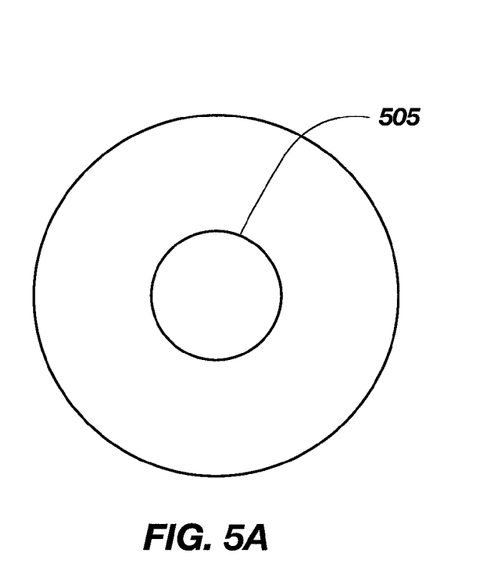
FIGS. 5A and 5B illustrate embodiments of nozzles that may be employed to provide gas jets in the apparatuses and methods illustrated schematically in FIGS. 2, 3A, 3B, and 4.
Figure 5B:
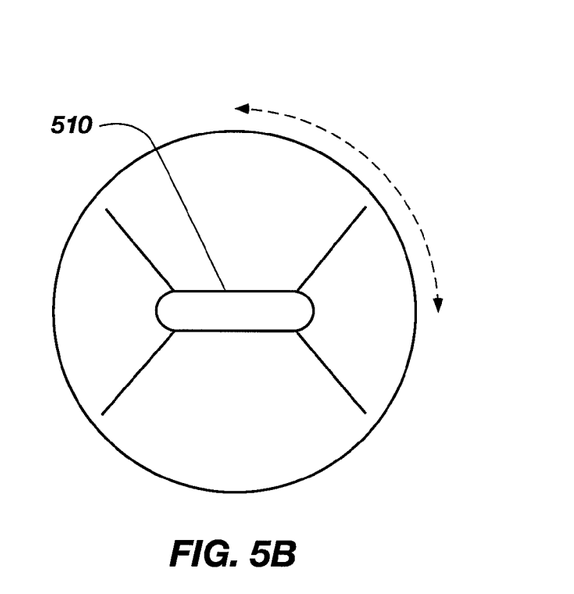

The gas jets 215 described herein may include a nozzle having an aperture configured to define the cross-sectional profile (i.e., the cross-sectional area and cross-sectional shape) of the gas stream emitted thereby. Many suitable nozzle aperture designs comprising symmetric and asymmetric cross-sections may be employed. By way of example and not limitation, a nozzle aperture 505 may have a substantially round or circular geometry, as shown in FIG. 5A. As another non-limiting example, a nozzle aperture 515 may have a substantially flat or oblong geometry, as shown in FIG. 5B. A nozzle like that shown in FIG. 5B may be oriented relative to the cutting element 100 such that the substantially flat aperture is oriented to coincide with a profile of the chamfer being formed. In other words, the longer flat sides of the aperture of the nozzle may be oriented so as to be oriented parallel to a plane tangent to the chamfer being formed, which may further optimize the gas flow over the cutting element 100.

In still other embodiments, a thin film of material (not shown) may be disposed over at least the portion of the layer of superabrasive material 105 to be chamfered. The thin film of material may comprise a material that is reactive with the superabrasive material, whereby a reaction between the film material and the superabrasive material is initiated and/or sustained by the emitter. The thin film may be applied in a separate processing step or in situ ahead of the emitter interaction spot thereby creating either a static or continuous process. By way of example and not limitation, if the layer of superabrasive material 105 comprises a diamond material, the thin film of material may comprise iron, since iron reacts with diamond at temperatures at or above approximately 700° C. The thin film of material may be disposed so as to only be positioned over the areas of the layer of superabrasive material 105 in which it is desired to form the chamfer or it may cover the entire surface of the table, being affected only by the laser along the desired chamfer location. As the energy beam emitted by the at least one emitter 210 impinges on the cutting element 100, the layer of superabrasive material 105 and the thin film of material thereon may be heated to a temperature that causes a reaction between the iron in the thin film of material and the diamond material in the layer of superabrasive material 105 in such a way that the diamond carburizes at that location. In some embodiments, the use of a gas stream may be employed to remove or aid in the removal of reacted species and/or to further enable the conversion process.

In operation of a chamfering device of an embodiment of the invention, a cutting element 100 may be secured in a chuck 205. As described above, the cutting element 100 may have a thin film of material positioned over the superabrasive material 105, covering at least the portion to be chamfered. A steady flow of gas may be streamed across the contact area 310 and the emitter or emitters 210 may be energized such that an energy beam is directed to the peripheral edge of the table of superabrasive material 105. The chamfer may be formed by rotating the cutting element 100, the emitter 210 emitter 210, or both or both, about the cutting element's longitudinal axis 220 in either a clockwise or counter-clockwise rotation while removing the material from the peripheral edge of the table of superabrasive material 105. Additionally, the chamfer may be polished by the same chamfering device or by a separate chamfering device.

Forming and polishing the chamfer using at least one chamfering device in accordance with an embodiment of the invention may reduce damage to the cutting element 100 (e.g., damage to the regions of the layer of superabrasive material 105 proximate the chamfer). By reducing such damage, cutting elements 100 having one or more chamfers formed according to embodiments of methods of the present invention may exhibit improved performance relative to cutting elements 100 having chamfers formed using conventional mechanical polishing and lapping processes. Additionally, the speed at which chamfers may be formed using embodiments of methods of the present invention may be increased relative to chamfering speeds achievable using conventional techniques.

Figure 6:
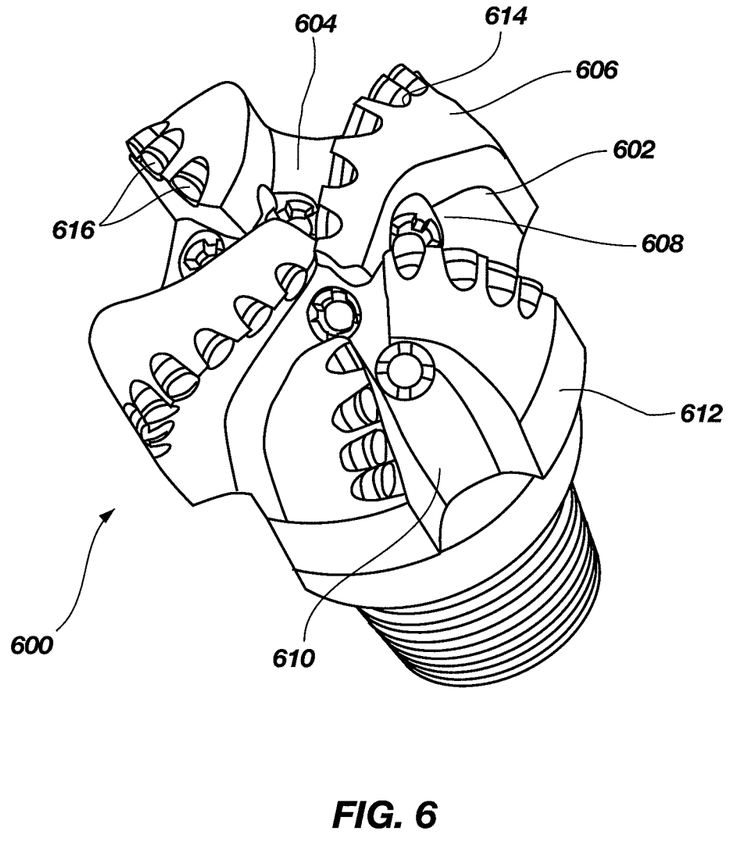
FIG. 6 illustrates an example of an embodiment of an earth-boring tool having at least one cutting element comprising a chamfer at least partially formed and/or polished using embodiments of apparatuses and methods of the present invention, such as those shown in FIGS. 2, 3A, 3B, and 4.

FIG. 6 illustrates an embodiment of an earth-boring tool. The earth-boring tool illustrated in FIG. 6 comprises a fixed-cutter drill bit 600 (often referred to as a "drag" bit) including cutting elements 616 having a chamfer around at least a portion of a peripheral edge of a layer of superabrasive material 105 (FIG. 1). The drill bit 600 may include a bit body 602 having a face 604 and generally radially extending blades 606, forming fluid courses 608 therebetween extending to junk slots 610 between circumferentially adjacent blades 606. Bit body 602 may comprise a metal or metal alloy, such as steel, or a particle-matrix composite material, as are known in the art.

Blades 606 may include a gage region 612 which is configured to define the outermost radius of the drill bit 600 and, thus, the radius of the wall surface of a bore hole drilled thereby. Gage regions 612 comprise longitudinally upward (as the drill bit 600 is oriented during use) extensions of blades 606 and may have wear-resistant inserts or coatings, such as hardfacing, cutting elements, or wear resistant pads, bricks, or studs, on radially outer surfaces thereof as known in the art to inhibit excessive wear thereto.

Drill bit 600 may also be provided with pockets 614 in blades 606 which may be configured to receive cutting elements 616. Cutting elements 616 may be affixed within the pockets 614 on the blades 606 of drill bit 600 by way of brazing, welding, or as otherwise known in the art. Cutting elements 616 include at least one chamfer at least partially extending along an edge thereof formed and/or polished using embodiments of methods of the present invention, such as those previously described herein.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. For example, although the embodiments describe the cutting elements as having a diamond table, at least some of the techniques described herein may be applied to other cutter materials as well. Thus, the scope of the invention is only limited by the literal language, and legal equivalents, of the claims which follow.

What is claimed is:

1. An apparatus for forming a chamfer on a cutting element for an earth-boring tool, comprising:
   a device configured to temporarily hold and position a cutting element for an earth-boring tool;
   a first emitter rotatable about a longitudinal axis of the cutting element and configured to emit a beam of energy at a first wavelength and oriented to form a chamfer on an edge of a superabrasive table of the cutting element held and positioned by the device using the beam of energy emitted by the first emitter toward the edge of the superabrasive table of the cutting element, the first emitter being located on a first side of the device configured to temporarily hold and position the cutting element; and
   an additional emitter rotatable about the longitudinal axis of the cutting element and configured to emit another beam of energy at a second, different wavelength and oriented to polish the chamfer using the another beam of energy emitted by the additional emitter toward the edge of the superabrasive table of the cutting element, the additional emitter being located on a second, opposing side of the device configured to temporarily hold and position the cutting element.

2. The apparatus of claim 1, wherein the device configured to temporarily hold and position the cutting element is configured to rotate the cutting element about the longitudinal axis of the cutting element.

3. The apparatus of claim 1, further comprising structure configured to manipulate the beam of energy emitted by the first emitter to adjust a direction of the beam of energy.

4. The apparatus of claim 1, wherein the first emitter is oriented to direct the beam of energy toward the edge of the superabrasive table of the cutting element in a direction at least substantially perpendicular to the longitudinal axis of the cutting element held by the device.

5. The apparatus of claim 1, wherein the first emitter is oriented to direct the beam of energy toward the edge of the superabrasive table of the cutting element in a direction at least substantially parallel to the longitudinal axis of the cutting element held by the device.

6. The apparatus of claim 1, wherein the first emitter is oriented to direct the beam of energy toward the edge of the superabrasive table of the cutting element in a direction oriented at an acute angle to the longitudinal axis of the cutting element held by the device.

7. The apparatus of claim 6, wherein the acute angle is selected from a range of angles between 15 degrees and about 75 degrees.

8. The apparatus of claim 1, wherein the first emitter comprises a laser.

9. The apparatus of claim 8, wherein the first emitter comprising the laser is configured as an Nd-YAG laser or an ArF excimer laser.

10. The apparatus of claim 1, wherein the first emitter is configured to emit a particle beam.

11. The apparatus of claim 10, wherein the first emitter is configured to emit a beam of ions or a beam of molecules.

12. The apparatus of claim 1, further comprising at least one gas jet positioned and oriented to direct a stream of gas toward the edge of the superabrasive table of the cutting element held by the device.

13. The apparatus of claim 12, wherein the at least one gas jet is positioned and oriented to direct a predominant velocity vector of the stream of gas at least substantially parallel to a velocity vector of the edge of the superabrasive table of the cutting element held by the device.

14. The apparatus of claim 12, wherein the at least one gas jet is positioned and oriented at an acute angle relative to the longitudinal axis of the cutting element held by the device.

15. A method of forming a cutting element, comprising:
forming a layer of superabrasive material on a substrate;
temporarily securing the substrate in a chuck;
directing a first laser beam emitted by a first laser device onto an edge of the layer of superabrasive material, the first laser device being located on a first side of the chuck;
directing an additional laser beam emitted by an additional laser device onto the edge of the layer of superabrasive material while the first laser beam is directed onto the edge of the layer of superabrasive material by the first laser device, the additional laser device being located on a second, opposing side of the chuck;
rotating at least one of the cutting element, the first laser device, and the additional laser device about a longitudinal axis of the cutting element;
forming a chamfer at least partially along the peripheral edge of the layer of superabrasive material using the first laser beam; and
polishing the chamfer using the additional laser beam while the chamfer is formed using the first laser beam.

16. The method of claim 15, wherein forming the layer of superabrasive material comprises forming a layer of polycrystalline diamond.

17. The method of claim 16, wherein forming the layer of polycrystalline diamond comprises forming the layer of polycrystalline diamond comprising a cobalt binder, and further comprising at least partially removing the cobalt binder from the layer of polycrystalline diamond prior to forming the chamfer using the energy beam.

18. The method of claim 15, further comprising manipulating at least one of the first laser beam and the additional laser beam to adjust a direction thereof.

19. The method of claim 15, further comprising directing at least one stream of gas onto a point of contact between the superabrasive table and at least one of the first laser beam and the additional laser beam.

20. The method of claim 15, further comprising:
depositing an additional layer of material over at least a portion of the layer of superabrasive material;
directing the first laser beam onto an exposed surface of the additional layer of material; and
transferring energy from the additional layer of material to the layer of superabrasive material.

21. The method of claim 15, wherein depositing the additional layer of material over the at least a portion of the layer of superabrasive material comprises depositing an additional layer of material that is reactive with the superabrasive material over the at least a portion of the layer of superabrasive material.

22. A method for forming an earth-boring tool, comprising:
temporarily securing a cutting element for an earth-boring tool in a chuck;
directing a first energy beam at a first wavelength from a first emitter onto an edge of a superabrasive table of the cutting element, the first emitter being located on a first side of the chuck;
directing an additional energy beam at an additional, different wavelength from an additional emitter onto the edge of the superabrasive table, the additional emitter being located on a second, opposing side of the chuck;
rotating the first energy beam and the additional energy beam about a longitudinal axis of the cutting element;
moving a point of contact between the first energy beam and the superabrasive table along the edge to form a chamfer along at least a portion of the edge;
moving a point of contact between the additional energy beam and the superabrasive table along the edge to polish the chamfer; and
securing the cutting element to a body of an earth-boring tool.

23. The method of claim 22, wherein directing the first energy beam comprises directing the first energy beam onto the edge of the superabrasive table of the cutting element in a direction at least substantially perpendicular to the longitudinal axis of the cutting element.

24. The method of claim 22, wherein directing the first energy beam comprises directing the first energy beam onto the edge of the superabrasive table of the cutting element in a direction at least substantially parallel to the longitudinal axis of the cutting element.

25. The method of claim 22, wherein directing the first energy beam comprises directing the first energy beam onto the edge of the superabrasive table of the cutting element in a direction oriented at an acute angle to the longitudinal axis of the cutting element.

26. The method of claim 22, further comprising disposing a thin film material over at least a portion of the superabrasive table prior to directing the first energy beam onto the edge of the superabrasive table, the thin film material comprising a material that is reactive with the material comprising the superabrasive table.

27. The method of claim 22, wherein moving the point of contact between the first energy beam and the superabrasive table along the edge to form the chamfer along the at least a portion of the edge comprises rotating at least one of the chuck and the first emitter configured to emit the first energy beam about the longitudinal axis of the cutting element.

28. The method of claim 22, wherein moving the point of contact between the first energy beam and the superabrasive table along the edge to form the chamfer along the at least a portion of the edge comprises manipulating the first energy beam to adjust the direction thereof.

29. The method of claim 22, further comprising directing at least one stream of gas onto the point of contact between the first energy beam and the superabrasive table.

* * * * *

UNITED STATES PATENT AND TRADEMARK OFFICE
CERTIFICATE OF CORRECTION

| | | |
|---|---|---|
| PATENT NO. | : 9,259,803 B2 | Page 1 of 1 |
| APPLICATION NO. | : 12/265462 | |
| DATED | : February 16, 2016 | |
| INVENTOR(S) | : Anthony A. DiGiovanni | |

It is certified that error appears in the above-identified patent and that said Letters Patent is hereby corrected as shown below:

In the specification:

COLUMN 1, LINE 6, change "CROSS CROSS-REFERENCE" to --CROSS-REFERENCE--

COLUMN 2, LINE 25, change "a fine polished" to --a fine, polished--

COLUMN 7, LINES 26-27, change "the emitter 210 emitter 210, or both or both," to --the emitter 210, or both,--

Signed and Sealed this
Nineteenth Day of July, 2016

Michelle K. Lee
*Director of the United States Patent and Trademark Office*